US012210682B2

(12) United States Patent
Baber et al.

(10) Patent No.: US 12,210,682 B2
(45) Date of Patent: Jan. 28, 2025

(54) SYSTEMS AND METHODS INVOLVING DEVICES THAT DETECT MIND/BRAIN ACTIVITY, GENERATION OF CONTROL INSTRUCTIONS VIA SAME AND/OR OTHER FEATURES

(71) Applicant: MindPortal, Inc., San Francisco, CA (US)

(72) Inventors: Jack Baber, San Francisco, CA (US); Ekram Alam, San Francisco, CA (US)

(73) Assignee: MindPortal, Inc., San Francisco, CA (US)

( * ) Notice: Subject to any disclaimer, the term of this patent is extended or adjusted under 35 U.S.C. 154(b) by 0 days.

(21) Appl. No.: 17/700,481

(22) Filed: Mar. 21, 2022

(65) Prior Publication Data
US 2022/0300075 A1     Sep. 22, 2022

Related U.S. Application Data

(60) Provisional application No. 63/163,780, filed on Mar. 19, 2021.

(51) Int. Cl.
*G06F 3/01* (2006.01)

(52) U.S. Cl.
CPC ................. *G06F 3/015* (2013.01)

(58) Field of Classification Search
CPC ......... G06F 3/015; G06F 3/163; G06F 3/1689
USPC ............................................. 345/156
See application file for complete search history.

(56) References Cited

U.S. PATENT DOCUMENTS

| | | | | |
|---|---|---|---|---|
| 11,353,960 | B1* | 6/2022 | Grant | G06F 3/015 |
| 2009/0270745 | A1* | 10/2009 | Sankai | A61B 5/6814 |
| | | | | 600/504 |
| 2011/0046491 | A1 | 2/2011 | Diamond | |
| 2012/0299822 | A1* | 11/2012 | Lee | G06F 3/015 |
| | | | | 345/156 |

(Continued)

OTHER PUBLICATIONS

International Search Report and Written Opinion from counterpart PCT application No. PCT/US/2022/021228, mailed Jul. 14, 2022, 9 pgs.

*Primary Examiner* — Calvin C Ma
(74) *Attorney, Agent, or Firm* — Greenberg Traurig, LLP

(57) ABSTRACT

Systems, methods and wearable devices associated with mind/brain-computer interfaces are disclosed. Embodiments herein include features related to one or more of optical-based brain signal acquisition, decoding modalities, encoding modalities, brain-computer interfacing, AR/VR content interaction, signal to noise ration enhancement, and/or motion artefact reduction, among other features set forth herein. Certain implementations may include or involve processes of collecting and processing brain activity data, such as those associated with the use of a brain-computer interface that enables, for example, decoding and/or encoding a user's brain functioning, neural activities, and/or activity patterns associated with thoughts, including sensory-based thoughts. Further, the present systems and methods may be configured to leverage brain-computer interface and/or non-invasive wearable device aspects to provide enhanced user interactions for next-generation wearable devices, controllers, and/or other computing components based on the human thoughts, brain signals, and/or mind activity that are detected and processed.

20 Claims, 16 Drawing Sheets

(56) References Cited

U.S. PATENT DOCUMENTS

| | | |
|---|---|---|
| 2018/0064393 A1 | 8/2018 | Lynch |
| 2019/0336081 A1 | 7/2019 | LeBoeuf |
| 2020/0253479 A1 | 8/2020 | Nurmikko |
| 2021/0259632 A1* | 8/2021 | Seidman .............. A61B 5/0059 |

* cited by examiner

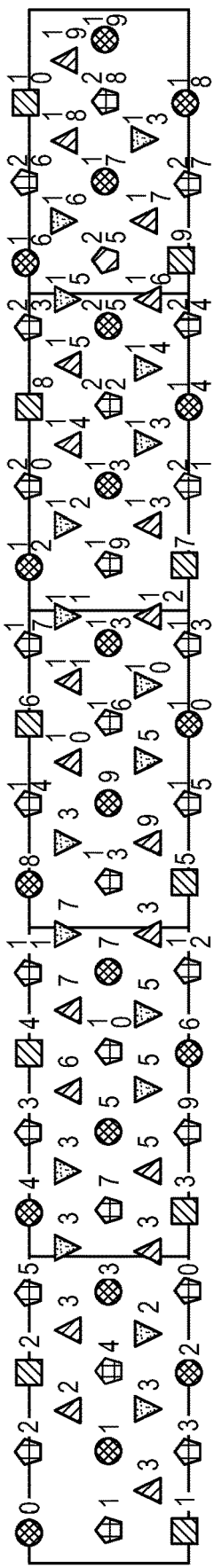
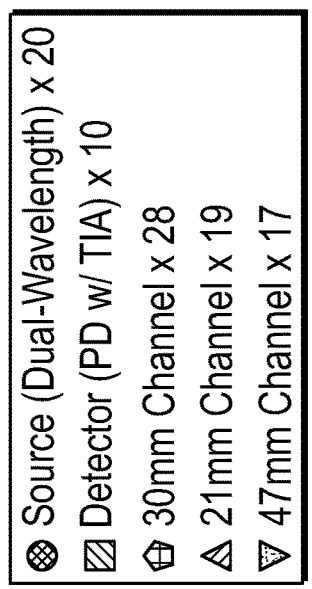
FIG. 10C
Example Showing All Channels

SYSTEMS AND METHODS INVOLVING DEVICES THAT DETECT MIND/BRAIN ACTIVITY, GENERATION OF CONTROL INSTRUCTIONS VIA SAME AND/OR OTHER FEATURES

CROSS-REFERENCE TO RELATED APPLICATION(S) INFORMATION

This application claims benefit/priority of U.S. provisional patent application No. 63/163,780, filed Mar. 19, 2021, which is incorporated herein by reference in entirety.

DESCRIPTION OF RELATED INFORMATION

Conventionally, one significant challenge in the general field of brain-computer interfaces lies in the absence of options that are one or both of non-invasive and/or effective with regard to the interfaces that are in communication with both neurons (e.g., a brain) and computing systems. For instance, as illustrated in FIG. 1A, a conventional electro-encephalography (EEG) device may be attached to the scalp of a human to detect/collect brainwave related electrical activities of the user's brain. As shown herein, on the data collecting side, the EEG device 110 may be coupled via thin wires to the human scalp at a plurality of electrodes comprising small metal discs 105 attached (e.g., pasted using conductive gel, etc.) onto the scalp. On the other side, a computing system 115 may be configured to provide on a monitor to display button A and button B. In this setup, button A is controlled to flash at a frequency A, and button B is controlled to flash at a frequency B that is different from the frequency A. When the user looks at button A, the brain generates neural signals different than those when the user looks at button B. As such, when the user looks at button A, the corresponding brain signals are detected at the EEG device 110 for transmission to the computing system 110, based on what occurs when button A is selected. However, in this conventional approach, the EEG device can only collect data at a very poor resolution and/or signal to noise rate or ratio. Further, only discrete applications are enabled using this technique to distinguish binary data in terms of, for example, yes versus no, green versus red, left versus right, and the like. As the human mind and its manifest expressions are much richer than dichotomized information, such limited application of a brain-computer interface does not lend itself to natural (e.g., more nuanced) use cases. Further, in order for the brain-computer interface to associate the brain signals with the respective button (A or B) with working accuracy, the training time required tends to be lengthy, as well.

Further, as shown in FIG. 1B, an invasive brain-computer interface 125 may also theoretically be implanted directly into a brain at one end, and transmit signals to an external device (e.g., a computing device 135) at another end. In this illustrated example, such invasive brain-computer interface may be implanted in the motor cortex (e.g., via surgery on a localized region, etc.) of the user's brain to detect neural signals associated with brain activities. Here, when the user imagines moving the right arm versus moving the left arm, the detected signals are transmitted to the computing device 135 to cause the computing device 135 to select a displayed right arrow versus to select a displayed left arrow. With this approach, the brain-computer interface cannot decode all the senses of the user, and are limited to the use for medical patient only (e.g., augmenting vision, hearing impaired sensory abilities, etc.).

OVERVIEW OF SOME ASPECTS OF THE DISCLOSED TECHNOLOGY

One or more aspects of the present disclosure generally relate to improved computer-based systems, wearable devices, methods, platforms and/or user interfaces, and/or combinations thereof, and particularly to, improved computer-based systems, wearable devices, hardware architectures, methods, platforms and/or user interfaces associated with mind/brain-computer interfaces that are driven by various technical features and functionality, including laser/optical-based brain signal acquisition, decoding modalities, encoding modalities, brain-computer interfacing, AR/VR content interaction, signal to noise ration enhancement, and motion artefact reduction, among other features set forth herein. Aspects of the disclosed technology and platforms here may comprise and/or involve processes of collecting and processing brain activity data, such as those associated with the use of a brain-computer interface that enables, for example, decoding and/or encoding a user's brain/neural activities/activity patterns associated with thoughts such as those involving all types of senses (e.g., vision, language, movement, touch, smell functionality, sound, etc.), and the like. Systems and methods herein may include and/or involve the leveraging of innovative brain-computer interface aspects and/or a novel non-invasive wearable or portable device to facilitate and enhance user interactions that provide technical outputs, solutions and results, such as those required for or associated with next generation wearable devices, controllers, and/or other computing components based on human thought/brain/mind signal detection and computer device processing and interaction.

As set forth in the various illustrative embodiments described below, the present disclosure provides exemplary technically improved computer-based processes, systems and computer program products associated with or involving a brain-computer interface based platform that decodes and/or encodes neural activities associated with thoughts (e.g., human thoughts, etc.), user motions, and/or brain activity based on signals gathered from location(s) where brain-detection optodes are placed, which may operate in modalities such as vision, speech, sound, gesture, movement, actuation, touch, smell, and the like. According to some embodiments, the disclosed technology may include or involve process for detecting, collecting, recording, and/or analyzing brain signal activity, and/or generating output (s) and/or instructions regarding various data and/or data patterns associated with various neural activities/activity patterns, all via a non-invasive brain-computer interface platform. Empowered by the improvements set forth in the wearable and associated hardware, optodes, etc. herein, as well as its various improved aspects of data acquisition/processing set forth below, aspects of the disclosed brain-computer interface technology achieve high resolution, portability, and/or enhanced volume in terms of data collecting ability, among other benefits and advantages. These systems and methods leverage numerous technological solutions and their combinations to create a novel brain-computer interface platform, wearable devices, and/or other innovations that facilitate mind/brain computer interactions to provide specialized, computer-implemented functionality, such as optical modules (e.g., with optodes, etc.), thought detection and processing, limb movement decoding, whole body continuous movement decoding, AR and/or VR content interaction, direct movement goal decoding, direct imagined speech decoding, touch sensation decoding, and the like.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 10A-10C depicts illustrative implementations regarding optode modules, consistent with various exemplary aspects of one or more implementations of the disclosed technology.

DETAILED DESCRIPTION OF ILLUSTRATIVE IMPLEMENTATIONS

Systems, methods and wearable devices associated with mind/brain-computer interfaces are disclosed. Embodiments herein include features related to one or more of optical-based brain signal acquisition, decoding modalities, encoding modalities, brain-computer interfacing, AR/VR content interaction, signal to noise ration enhancement, and/or motion artefact reduction, among other features set forth herein. Certain implementations may include or involve processes of collecting and processing brain activity data, such as those associated with the use of a brain-computer interface that enables, for example, decoding and/or encoding a user's brain functioning, neural activities, and/or activity patterns associated with thoughts, including sensory-based thoughts. Further, the present systems and methods may be configured to leverage brain-computer interface and/or non-invasive wearable device aspects to provide enhanced user interactions for next-generation wearable devices, controllers, and/or other computing components based on the human thoughts, brain signals, and/or mind activity that are detected and processed.

Figure 1A:
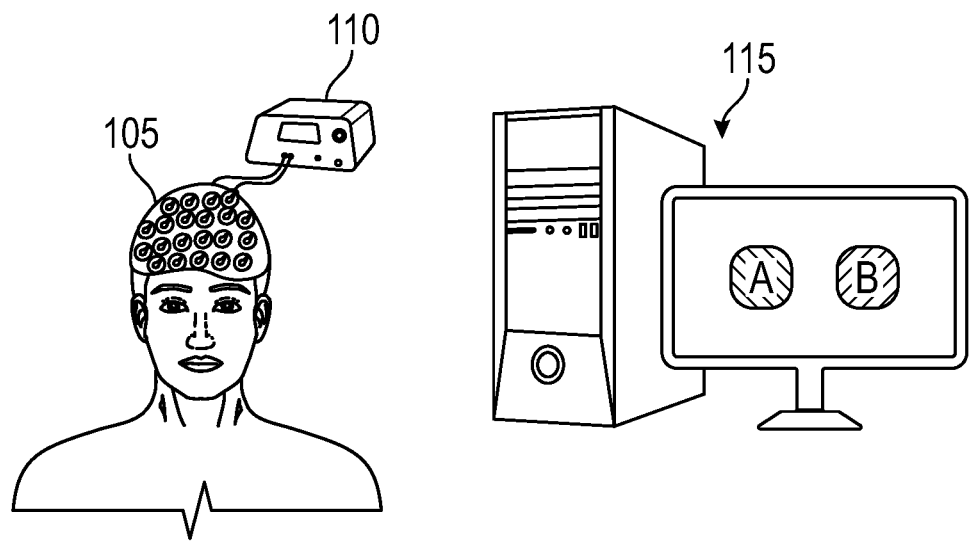
FIGS. 1A-1B describe prior art techniques of brain-computer interfaces (BCIs).
Figure 1B:
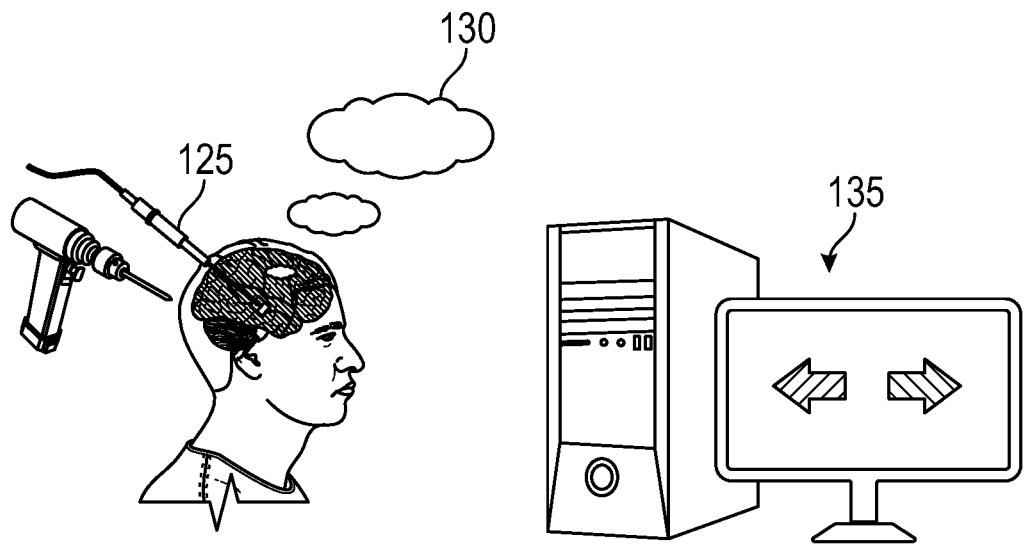
Figure 2A:
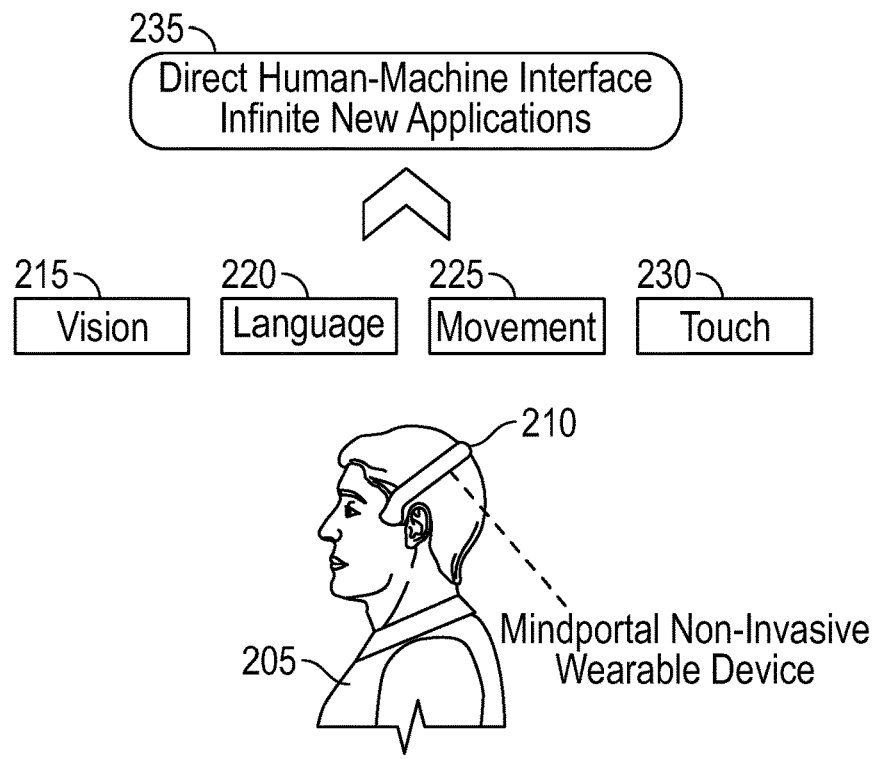
FIG. 2A is a diagram illustrating one exemplary process decoding neural activities associated with human thoughts of manifesting sensory modalities, consistent with exemplary aspects of certain embodiments of the present disclosure.

FIG. 2A is a diagram illustrating one exemplary process related to decoding neural activities associated with human thoughts involving or manifesting sensory modalities, consistent with exemplary aspects of certain embodiments of the present disclosure. In this illustrated example, a human user 205 may wear a non-invasive wearable device 210 that implements the brain computer interface (BCI) technology disclosed herein. Here, e.g., in connection with the BCI platform, device 210 may be configured to be positioned around the head/brain of the user so as to mount the scalp of the user. The BCI device 210 may also be configured to be worn in other suitable ways that do not require surgery on the user's head/brain. With the neural signals detected/collected, the BCI device 210 may directly decode those neural activities of the user's thoughts associated with all types of sensory abilities. For example, as shown herein, the neural activities may be decoded by the BCI device 210 into vision 215 (e.g., mental images, etc.), language 220 (e.g., imagined speech, etc.), movement 225, touch 230, and other sensory modalities. Empowered with the sensory data decoded from the neural activities, a variety of applications 235 may be implemented via the BSI technology disclosed herein. In some embodiments, direct human goals and software symbiosis is enabled using the present brain computer interface technology.

Figure 2B:
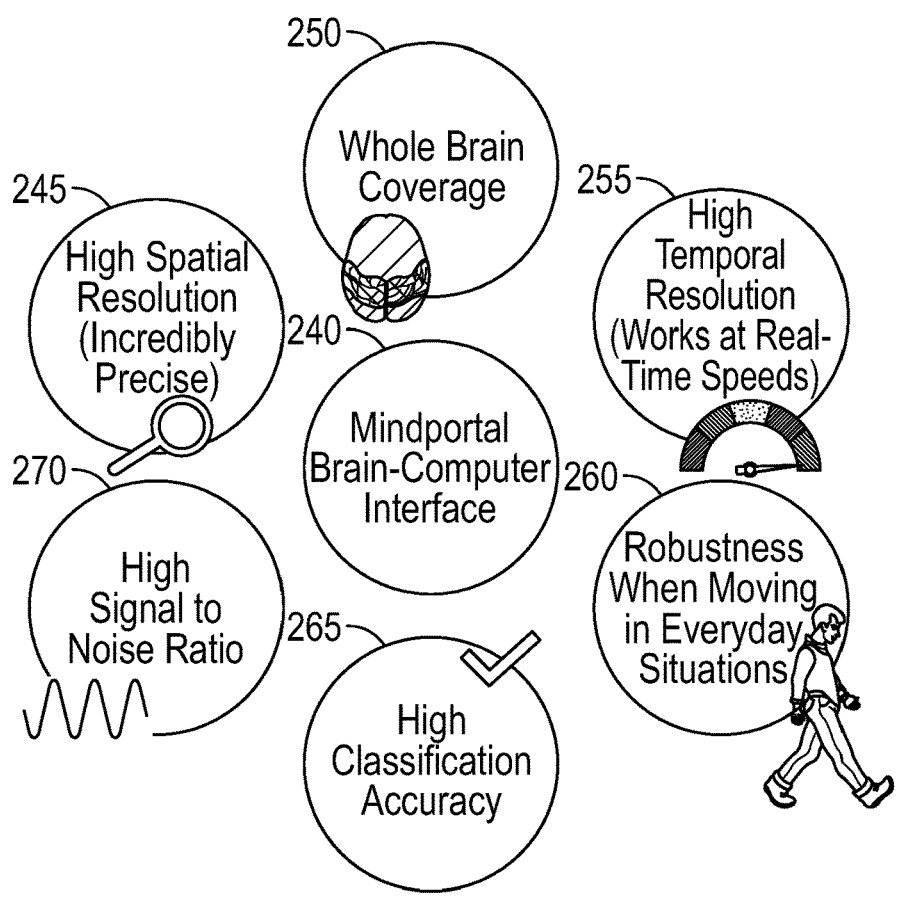
FIG. 2B is a diagram illustrating one exemplary BCI configured with exemplary features, consistent with exemplary aspects of certain embodiments of the present disclosure.

FIG. 2B is a diagram illustrating one exemplary brain computer interface 240 and various illustrative features, consistent with exemplary aspects of certain embodiments of the present disclosure. Here, such brain-computer interface 240 may be configured with various exemplary features and functionality such as ability to obtain neural activity data of high spatial resolution (e.g., highly precise) 245, obtain data spanning full brain coverage 250, obtain data of high temporal resolution (e.g., works at real-time speed/manner, etc.) 255, obtain data that is robust and accurate, e.g., when the user moves about in everyday situations, etc., at 260, obtain data of high classification accuracy 265, obtain data of high signal to noise ratio 270, and the like. As a result of these features and benefits, the brain-computer interface 240 may be configured to be worn by the user (or otherwise applied onto the user) in a more compelling and/or natural fashion.

Figure 3:
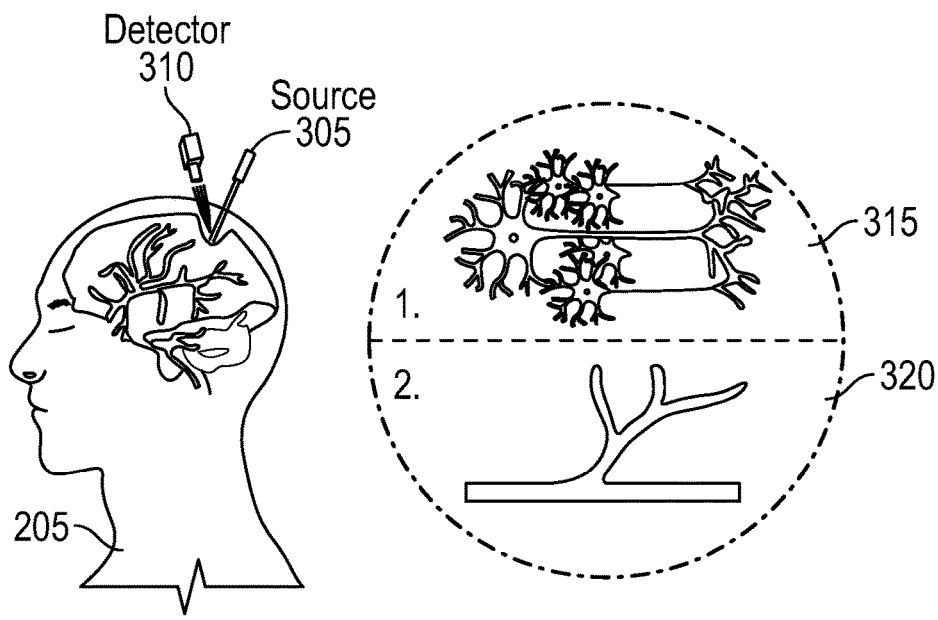
FIG. 3 depicts various exemplary aspects/principles involving detecting neural activities, consistent with exemplary aspects of certain embodiments of the present disclosure.

FIG. 3 depicts exemplary principles involved with detection of neural activities, consistent with exemplary aspects of certain embodiments of the disclosed technology. In this example, a non-invasive technology such as optoelectronic based technique is illustrated to implement a brain-computer interface of, for example, FIGS. 2A-2B. Here, a detector 310 and a source (e.g., an optical source, such as a laser light source, etc.) 305 are applied to the brain of the user 205. As the brain incurs neural activities (e.g., upon thoughts, including by not limited to those of senses such as an image, sound, speech, movement, touch, smell, etc., upon body movement(s), and/or upon brain activity in certain locations, etc.), different regions of neurons in the brain are "activated" as manifested in, e.g., changes in neurons themselves, changes in blood supplies to the neurons, and so on. In this example, using optical system(s) herein, brain-computer interfaces consistent with the disclosed technology may be configured to detect: 1) neuronal changes, as illustrated in the upper half circle, at 315; and/or 2) blood changes at active site of the brain, as illustrated in the lower half circle, at 320.

Figure 4:
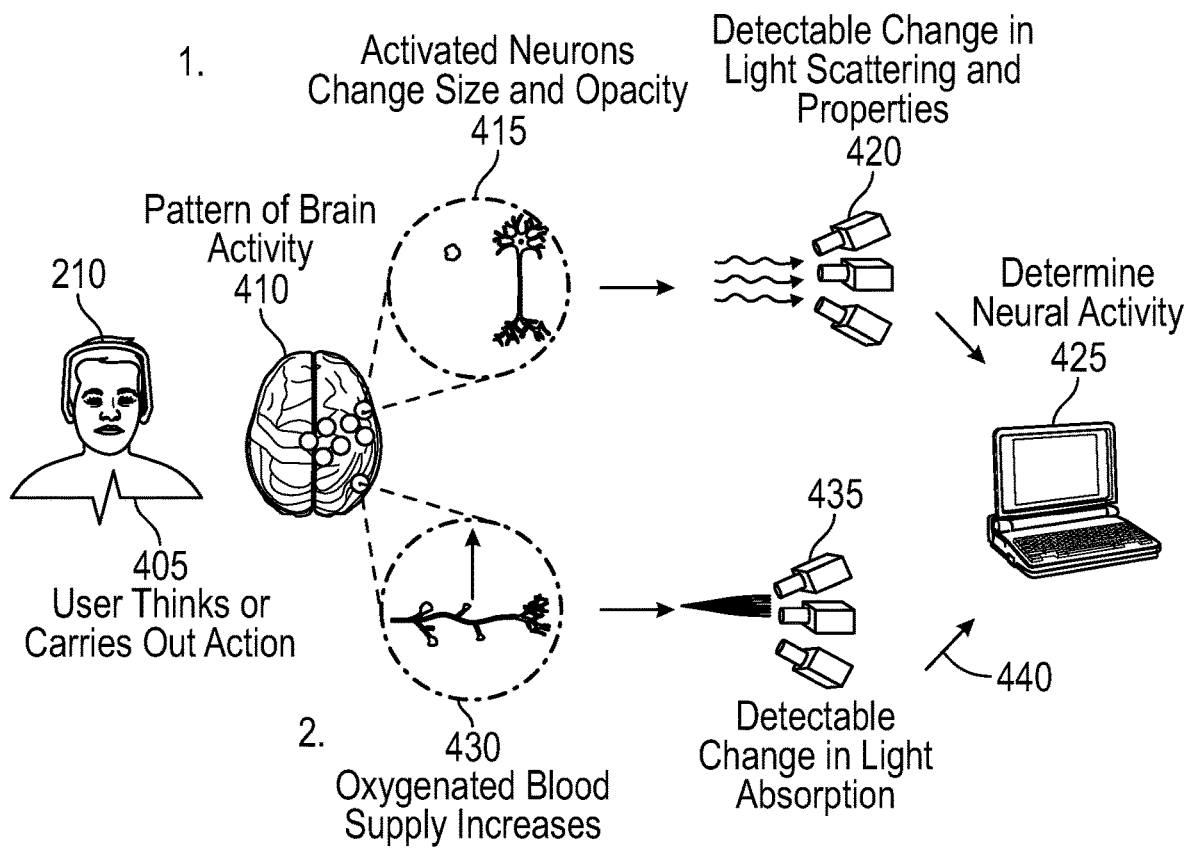
FIG. 4 depicts other exemplary aspects/processes involving detecting neural activities, consistent with exemplary aspects of certain embodiments of the present disclosure.

FIG. 4 is an exemplary flow diagram involving detection of neural activities, consistent with exemplary aspects of certain embodiments of the present disclosure. In this illustrated example, two pathways are shown with regard to communicate the user's thoughts to an external device. Here, the user (shown with wearable device 210) thinks or carries out an action at step 405. Upon such thoughts and/or actions, the pattern(s) of the brain activities 410 incurred are detected/collected via the brain-computer interface, at 420 and 435. Along the upper pathway, such patterns of neuron activities may be manifested in, as shown at step 415, activated neuron change in size and/or opacity, and/or other characteristics associated with a neuron activation state. As such, at step 420, the patterns of brain activities may be detected (e.g., by use of the optodes configured on device 210, etc.) via detectable changes in light scattering and/or properties caused by the afore-described changes in neurons. In this illustrative implementation, at 425, the detected signals are shown, in turn, being transmitted to an external device for further processing/application. Along the lower pathway, such patterns of neuron activities 410 may be manifested in, as shown at step 430, oxygenated blood supply increase, and/or other blood/blood vessel characteristics associated with a neuron activation state. As such, at step 435, the patterns of brain activities may be detected (e.g., by use of the optodes configured on device 210, etc.) via detectable changes in light absorption. In turn, such detected signals may then be transmitted to the external device for further processing/application, at 440. In some embodiments, the two pathways may also be reversed such that the brain-computer interface is a bi-directional and/or encoding interface that is capable of encoding signals (e.g., data, information of images, texts, sounds, movements, touches, smell, etc.) onto the user' brain to invoke thoughts/ actions based thereof. In some embodiments, the BCI may be configured to achieve signal detection precision level of 5 mm cubed, but the precision (spatial resolution) can be altered so as to extract information from volumes of the brain of different volumes/sizes.

Figure 5:
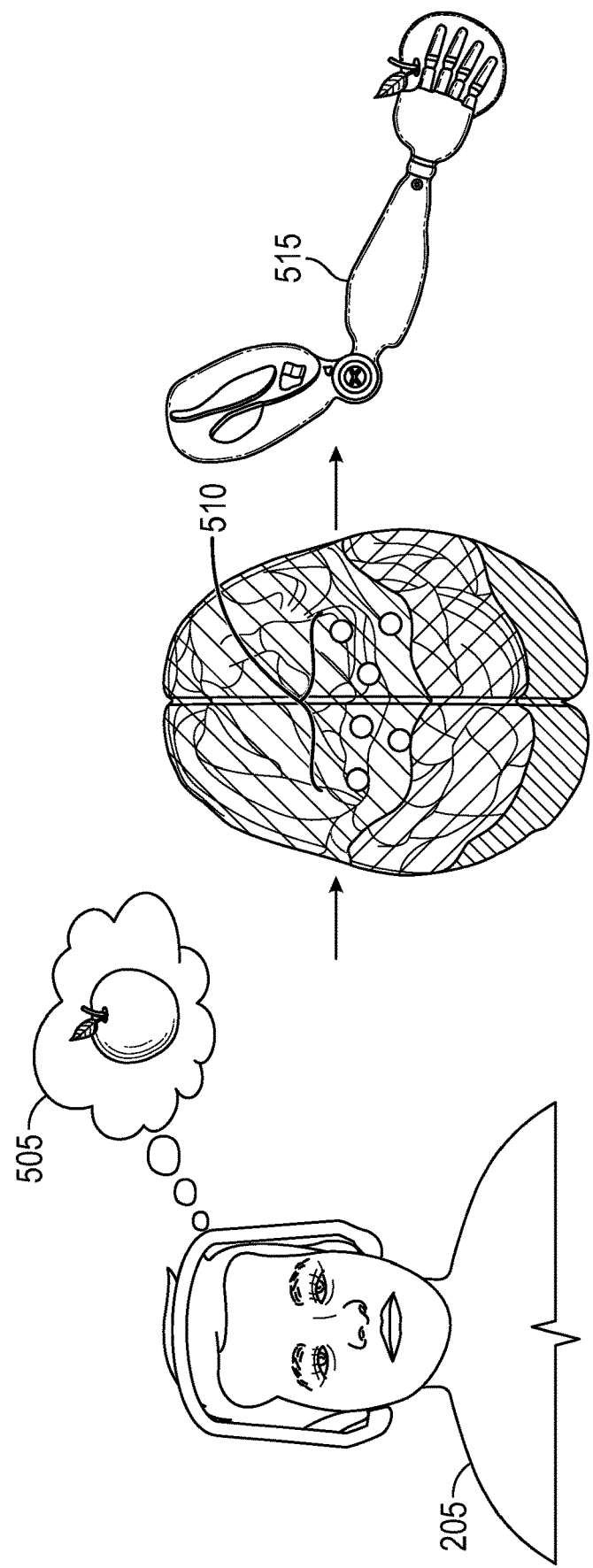
FIG. 5 is an exemplary application based on an exemplary BCI, consistent with exemplary aspects of certain embodiments of the present disclosure.

FIG. 5 depicts one illustrative application based on an exemplary brain-computer interface, consistent with exemplary aspects of certain embodiments of the present disclosure. In this example, the brain-computer interface is utilized to achieve a direct motor goal of a user. Here, the user 205 (wearing the BCI) contemplates a goal of picking up an apple in real and/or a virtual environment by, for example, thinking of picking up an apple, at 505. As a result, the goal itself may produce neural activity/activity pattern 510 before the movement is planned in/implemented by the brain. With as associated brain-computer interface detecting the corresponding neural activities 510 in the user's brain, a robot (e.g., robotic arm, etc.) and/or a virtual arm (e.g., a virtual entity's modality) may be actuated to make its own movement to pick up an apple, at 515, in the respective environment, based on the decoded user's goal.

Figure 6:
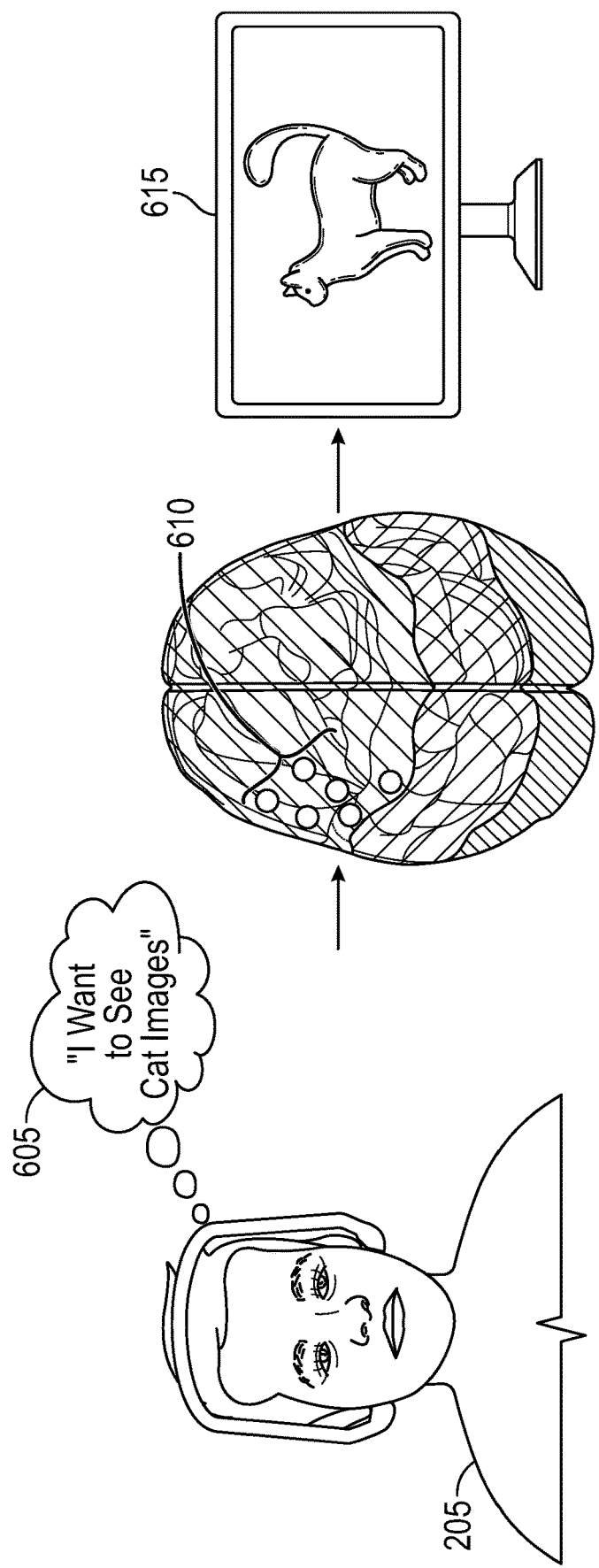
FIG. 6 is another exemplary application based on an exemplary BCI, consistent with exemplary aspects of certain embodiments of the present disclosure.

FIG. 6 depicts another illustrative application based on an exemplary brain-computer interface, consistent with exemplary aspects of certain embodiments of the present disclosure. In this example, the brain-computer interface is utilized to achieve a direct-imagined thought or speech of a user. Here, the user 205 (wearing the BCI) imagines semantic information, such as saying a sentence, a command or the like by thinking 605 of, for example, "I want to see cat images." As a result, the neural activity/activity pattern 610 associated with the semantic information is incurred in the user's brain. With the BCI detecting the corresponding neural activities 610 in the user's brain, a software application may be configured to convert the imagined speech to text or to otherwise carry out the imagined command. Here, the software is illustrated to execute the imagined command, hence, here, displaying a cat image on a display monitor, at 615.

Figure 7:
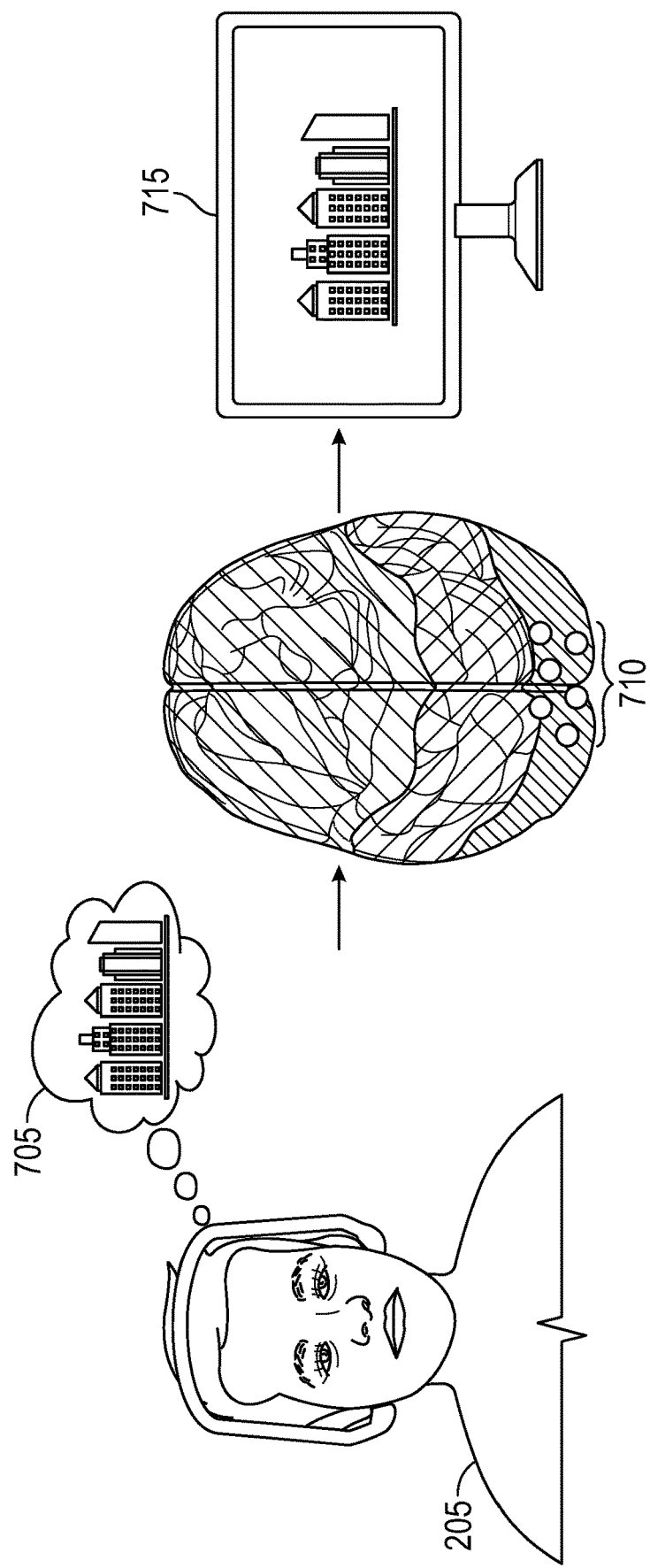
FIG. 7 is another exemplary application based on an exemplary BCI, consistent with exemplary aspects of certain embodiments of the present disclosure.

FIG. 7 depicts another illustrative application based on an exemplary brain-computer interface, consistent with exemplary aspects of certain embodiments of the present disclosure. In this example, the BCI is utilized to achieve a direct transfer of the imagined visual images of a user to a machine. Here, the user 205 (wearing the BCI) imagines visual information by thinking of, for example, a skyline (e.g., real and/or imaged/fictional) of a city (e.g., a real city and/or an imaged/fictional city), at 705. As a result, the neural activity/activity pattern 710 associated with the imagined visual information is incurred in, for example, the visual cortex portion of the user's brain. With the brain-computer interface detecting the corresponding neural activities 710 in the user's brain, a software application may be configured to directly decode the neural activity pattern to allow the imagined image to be reconstructed and/or displayed, at 715. In the present embodiment, for example, the software may decode and display the user's imagined visuals on a displaying monitor, as shown.

Figure 8:
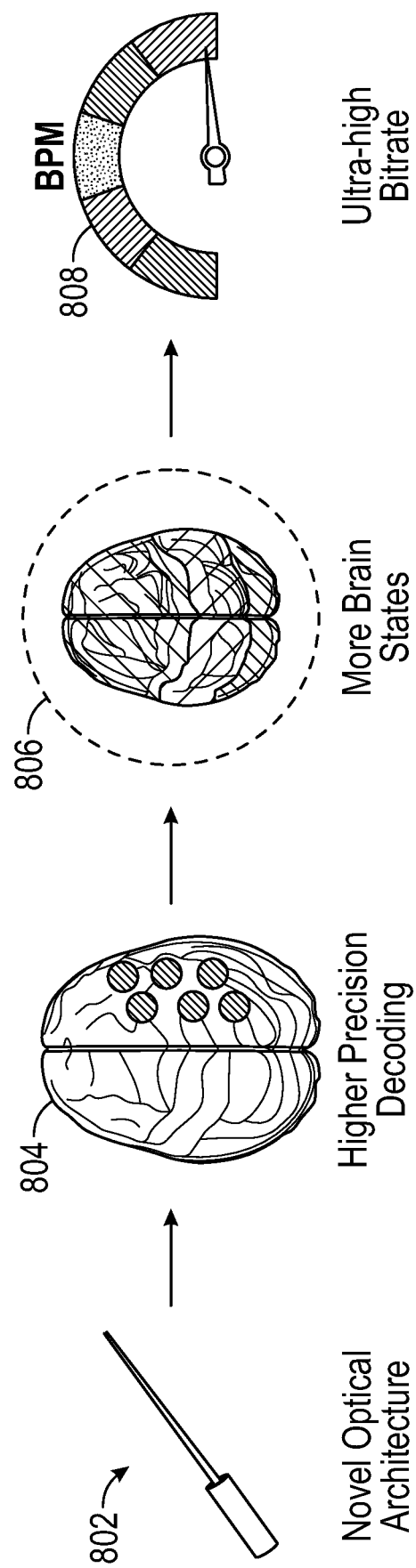
FIG. 8 is a flow diagram illustrating one simplified exemplary process, consistent with exemplary aspects of certain embodiments of the present disclosure.

FIG. 8 is a diagram illustrating another exemplary process flow, consistent with exemplary aspects of certain embodiments of the present disclosure. Here in this example, the disclosed novel optical architecture, at 802, is applied (in a non-invasive manner) to a user's brain to provide high/ higher precision decoding, at 804. As such, more brain activities/brain states may be detected, at 806, which leads to enhanced bitrate in data collection/detection, etc., at 808.

Figure 9A:
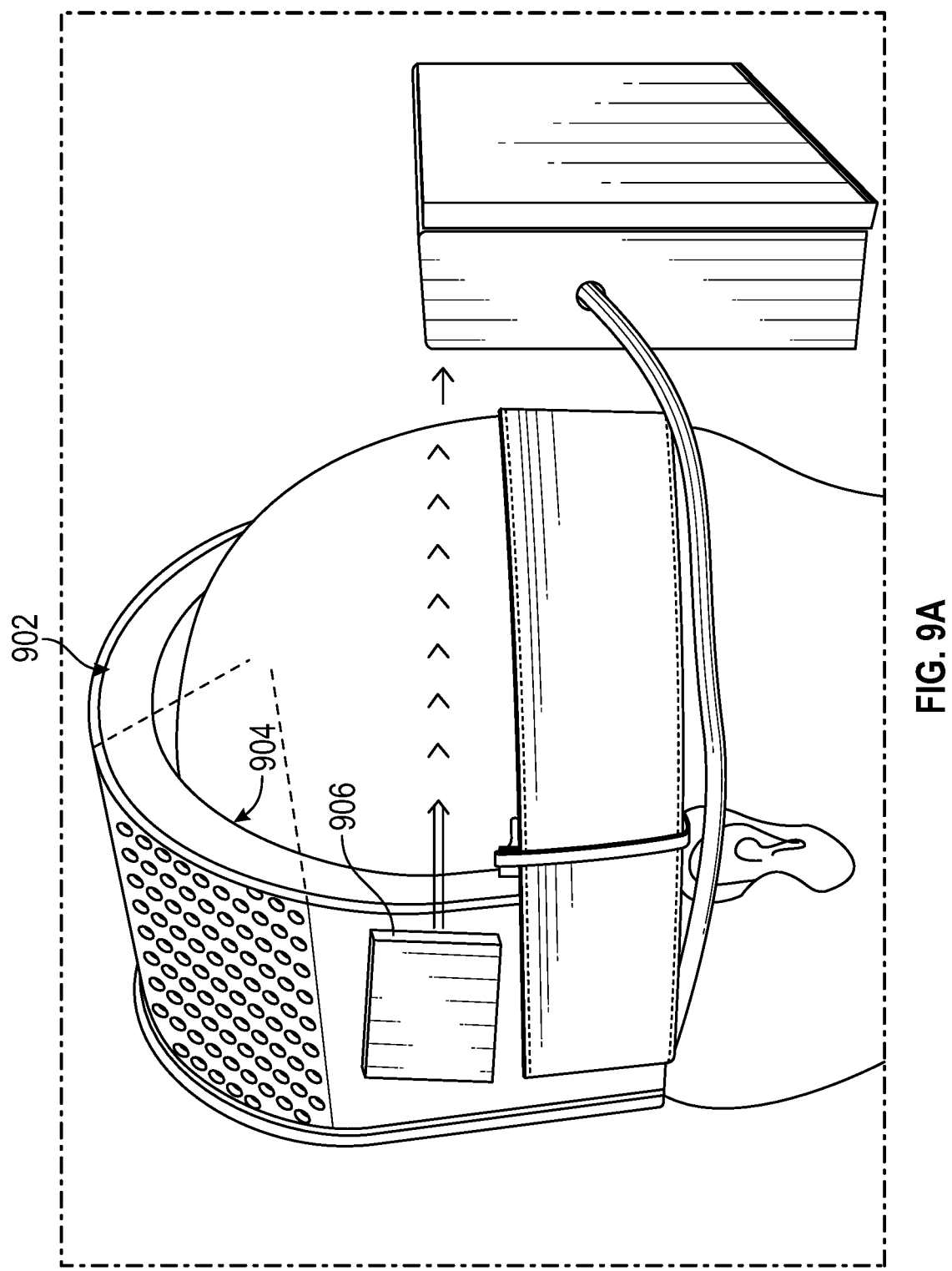
FIG. 9A is a diagram illustrating one exemplary wearable BCI device, consistent with exemplary aspects of certain embodiments of the present disclosure.

FIG. 9A is a diagram illustrating one exemplary wearable brain-computer interface device, consistent with exemplary aspects of certain embodiments of the present disclosure. As shown in this example, a wearable/portable brain-computer interface device 902 may be attached/associated and configured with respect to a user' head in a non-invasive manner. Here, the BCI device 902 is shown as mounted atop/across the user's head, with one or more brain-facing detection portions, panels or subcomponents 904 facing towards the user's brain. According to implementations herein, such brain-facing portions, panels or subcomponents 904 may include one or more optodes, which may each comprise: one or more sources, such as dual-wavelength sources, and/or one or more detectors, such as photodiodes (e.g., in some exemplary embodiments, with integrated TIAs, transimpedance amplifiers, etc.). Here, e.g., examples of such sources and detectors are shown and described in more detail in connection with FIGS. 9C-9D and 10A through 11C, below. In this illustrative example of FIG. 9A, the BCI device 902 may be adapted in any wearable shape or manner, including but not limited to the example embodiment shown, here, having a curved and/or head-shaped design. Here, for example, such that the wearable devices and/or subcomponents thereof (e.g., with optodes and/or comparable sources and detectors) can be adapted to adjustably fit and cover the user's head such that the desired optodes (or equivalent) are positioned over the portion(s) of the user's brain to capture the signals needed and/or of interest. In this example, the BCI device 902 may also be configured with one or more processing/computing subcomponents 906, which may be positioned or located on the wearable device itself and/or all or one or more portions thereof may be located elsewhere, physically and/or operationally/computationally, such as in a separate subcomponent and/or integrated with other computing/processing components of the disclosed technology e.g., the housing of 906 and everything within 906 may be placed on a wristband, watch, another such wearable, or other device and be connected to the remainder of the headset wirelessly, such as via Bluetooth or WiFi. Further, element 906 may be a housing which in this particular embodiment of a wearable is being used to house the wiring and the electronic circuitry shown in FIG. 9B, including components such as, e.g., the optical source drivers 922, analog to digital converters 916, 920, and microcontroller and wifi module 914.

Figure 9B:
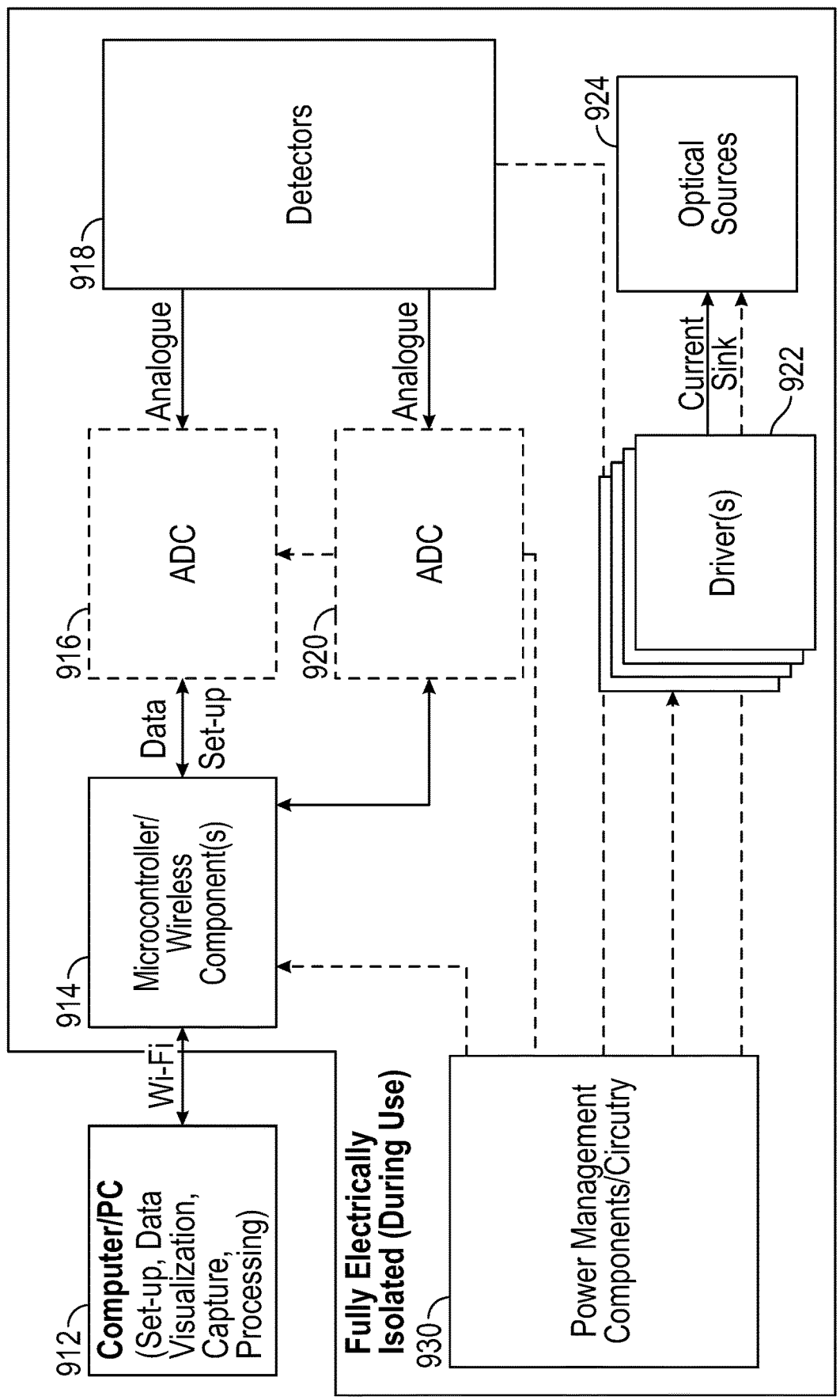
FIG. 9B is a block diagram illustrating an exemplary wearable BCI device, consistent with exemplary aspects of certain embodiments of the present disclosure.

FIG. 9B is a block diagram illustrating an exemplary brain-computer interface device, such as wearable device 902 shown in FIG. 9A and an associated computing device 912 (e.g., computer, PC, gaming console, etc.), consistent with exemplary aspects of certain embodiments of the present disclosure. As shown herein, an exemplary brain-computer interface device may comprise one or more of: one or more one optical source driver(s) 922, which may, e.g., be utilized to control the intensity, frequency and/or wavelength of the optical signals emitted by the optical sources and may also be configured, in some implementations, to set the electromagnetic energy to be emitted in continuous form or in timed pulses of various length or in other such frequency-type variation(s); at least one optical source 924 configured to emit the optical signal (e.g., light, laser, electro-magnetic energy, etc.), which, in some embodiments, may be in the near-infrared, infrared or visual range of the spectrum; one or more optional conversion components 916, 920, if/as needed, such as analog to digital and/or digital to analog converters; one or more optical detectors 918 that detect optical signals that exit the brain tissue containing information regarding the properties of the brain of the human user; at least one microcontroller and/or wifi module 914, where such microcontroller may be configured to sends control signals to activate the various components on the electronics layout and may also be configured to control the WiFi module. In some implementations, the microcontroller and/or wifi module 914 may be connected to one or more computing components 912, such as a PC, other computing device(s), gaming consoles, etc.] by one or both of a physical/hard-wire connection (e.g., USB, etc.) and/or via a wireless (e.g., WiFi, etc.) module. Further, the microcontroller and wifi module may be housed together, as shown, they may be split or distributed, and one, both or neither may be integrated with a wearable BCI device, another mobile device of the user (e.g., watch, smartphone, etc.) and/or the other computing and/or PC device(s) 912.

According to one or more embodiments, in operation, the driver(s) 922 may be configured to send a control signal to drive/activate the light sources 922 at a set intensity (e.g., energy, fluence, etc.), frequency and/or wavelength, such that optical sources 924 emit the optical signals into the brain of the human subject.

Turning next to operations associated with detection and/or handling of detected signals, in some embodiments, various processing occurs utilizing fast optical signals and/or haemodynamic measurement features, as also set forth elsewhere herein. In some embodiments, for example, one or both of such processing may be utilized, which may be carried out simultaneously (whether being performed simultaneously, time-wise, or in series but simultaneous in the sense that they are both performed during a measurement sequence) or separately from one another:

Fast Optical Signal (FOS) Processing:

According to such fast optical signal implementations, the optical signal entering the brain tissue passes through regions of neural activity, in which changes in neuronal properties alter optical properties of brain tissue, causing the optical signal to scatter differently as a scattered signal. Further, such scattered light then serves as the optical signal that exits the brain tissue as an output signal, which is detected by the one or more detectors to be utilized as the received optical signal that is processed.

Haemodynamic:

According to such haemodynamic implementations, first, optical signals entering brain tissue pass through regions of active blood flow near neural activity sites, at which changes in blood flow alter optical absorption properties of the brain tissue. Further, the optical signal is then absorbed to a greater/lesser extent, and, finally, the non-absorbed optical signal(s) exit brain tissue as an output signal, which is detected by the one or more detectors to be utilized as the received optical signal that is processed.

Turning to next steps or processing, the one or more detectors 918 pick-up optical signals which emerge from the human brain tissue. These optical signals may be converted, such as from analog to digital form or as otherwise needed, by one or more converters, such as one or more analog to digital converters 916, 920. Further, the resulting digital signals can be transferred to a computing component, such as a computer, PC, gaming console, etc. via the microcontroller and communication components (wireless, wired, WiFi module, etc.) for signal processing and classification.

Finally, various specific components of such exemplary wearable brain-computer interface device are also shown in the illustrative embodiment depicted in FIG. 9B, such as microcontroller/wireless component(s) 914 (which may include, e.g., a Pyboard D component), converters 916, 920 (which may include, e.g., ADS1299 ADC components), detectors 918 (which may include, e.g., an OPT101 component having photodiode with integrated TIA, etc.), optical sources (which may, e.g., include laser sources, LEDs, etc.), driver(s) 922 (which may include, e.g., one or more TLC5940 components, etc.), and a power management component, though the innovations herein are not limited to any such illustrative subcomponents.

Figure 9D:
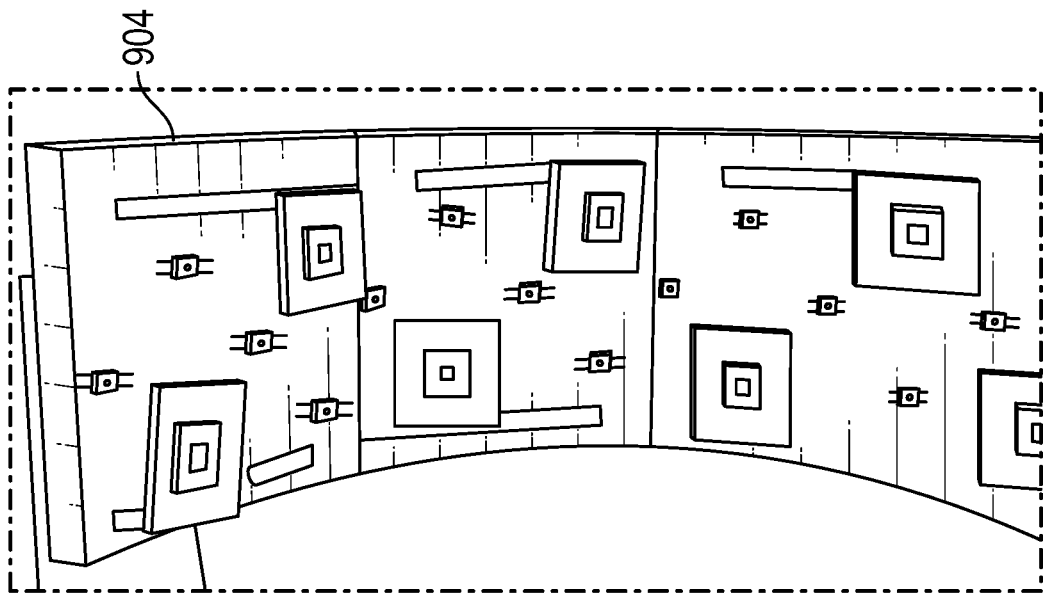
FIGS. 9C-9D are diagrams illustrating aspects of the one or more brain-facing detection portions, panels or subcomponents, consistent with exemplary aspects of one or more implementations of the present disclosure.
Figure 9C:
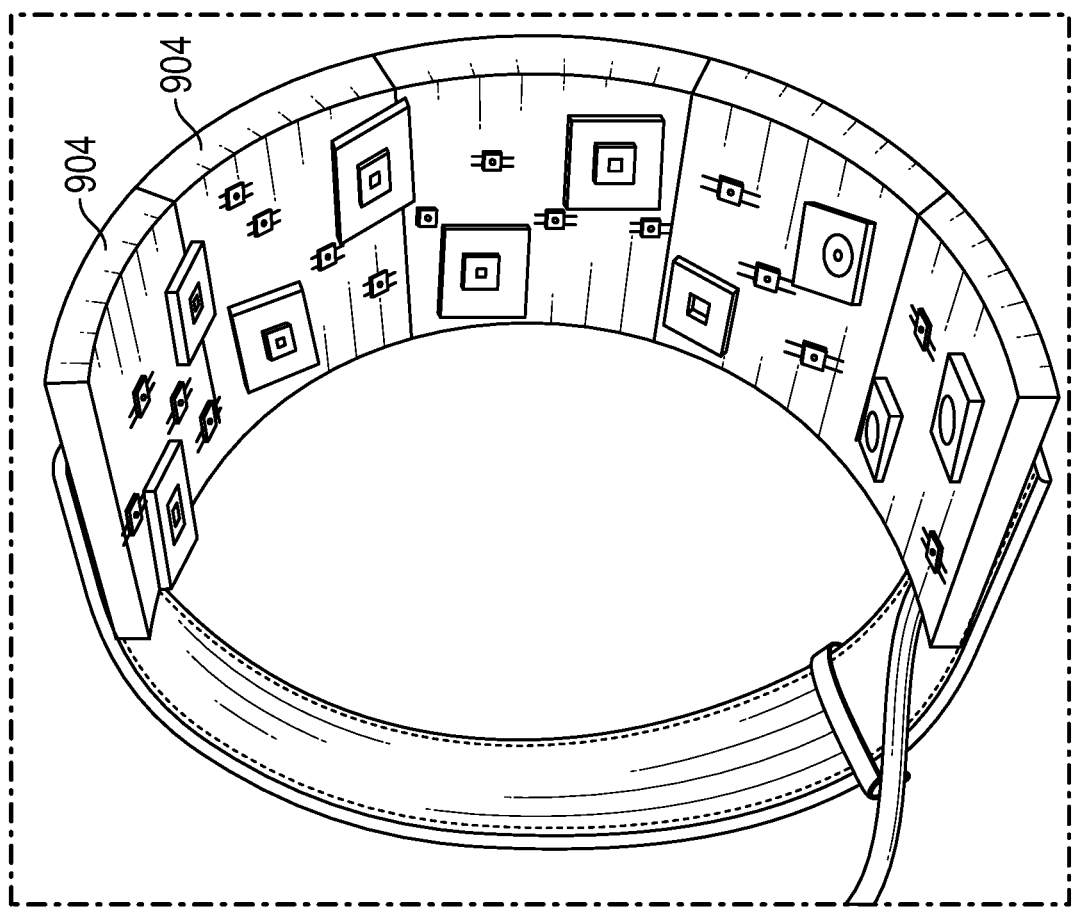

FIGS. 9C-9D are diagrams illustrating aspects of the one or more brain-facing detection portions, panels or subcomponents 904, consistent with exemplary aspects of certain embodiments of the present disclosure. As set forth in more detail elsewhere herein, such portions, panels or subcomponents 904 may be comprised of one or more panels, which each comprise one or more optodes 928. As set forth, below, each such optode may comprise: one or more sources, such as dual-wavelength sources, and/or one or more detectors, such as photodiodes (e.g., in some exemplary embodiments, with integrated TIAs, transimpedance amplifiers, etc.), such as shown and described in more detail in connection with FIGS. 9C-9D and 10A through 11C, below.

Figure 10A:
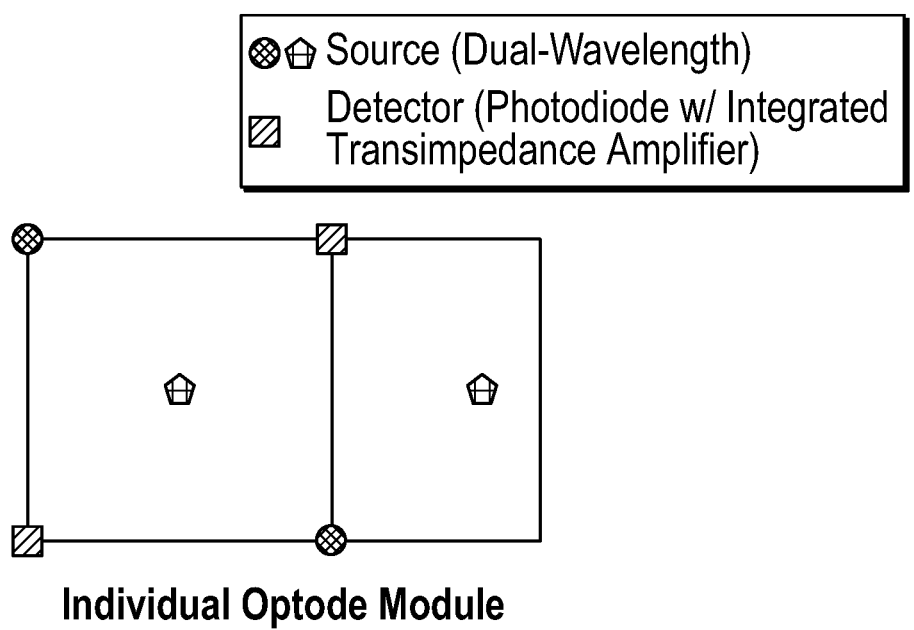

FIG. 10A is a representation depicting one illustrative optode module, consistent with various exemplary aspects of one or more implementations of the disclosed technology. Here, for example, rather than using individual sources and detectors, a wearable device or portion thereof may utilize a custom optode module, such as the exemplary optode module of FIG. 10A or elsewhere herein, that provides a number of benefits. As to one benefit, such optode modules may be shaped and configured to be placed adjacent to each other or otherwise repeated, which simplifies both construction (of the optodes and wearable) while also simplifying the process of increasing the number of channels.

According to certain implementations herein, such optode module or array may comprises 3-5 optical sources as well as 1-3 optical detectors. Further, some embodiment may comprise 4 optical sources and 2 optical detectors. Finally, in certain embodiments, at least one of the sources is positioned at or near center of the optode array.

Figure 10B:
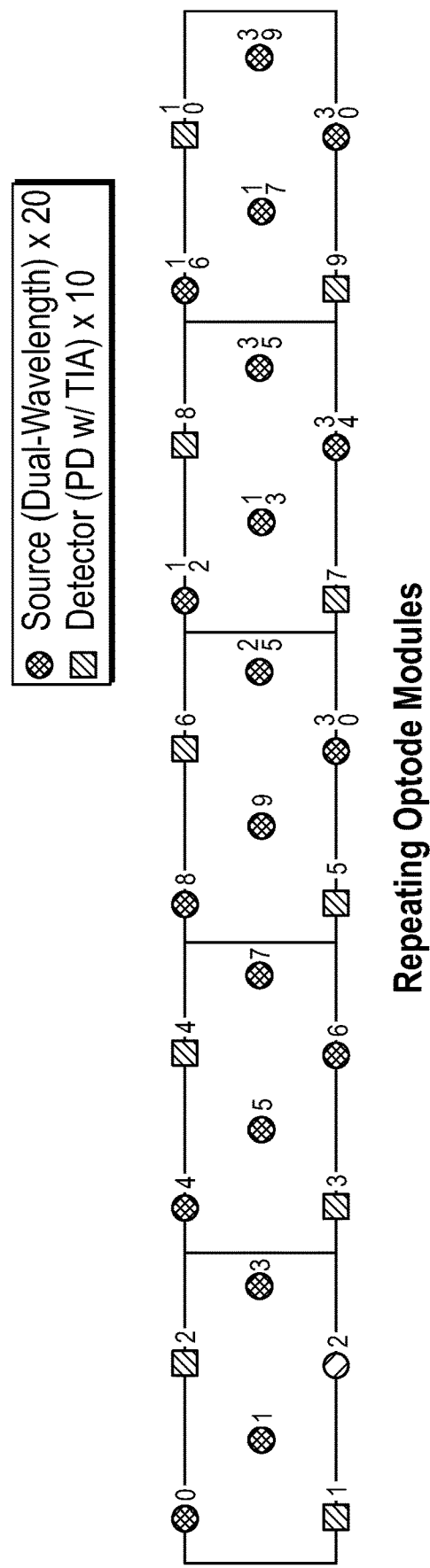

FIG. 10B depicts one illustrative implementation showing a series of repeating optode modules, consistent with various exemplary aspects of one or more implementations of the disclosed technology. Referring to FIG. 10B, a pattern of repeating optode modules is shown. Here, for example, such pattern or component array may provide coverage/detection of a brain motor cortex area of a user, according to one or more exemplary embodiments. Further, additional modules may also readily and easily be added above and below to increase or extend coverage even further, as desired or needed in certain implementations.

According to some example embodiments, herein, each such optode module may include, utilize and/or involve an optode configuration, including but not limited to the innovative optode configurations set forth herein. Further, as shown in implementations herein, such optode modules include one or more central/centralized sources in conjunction with various other features, as opposed to other source-detector configuration(s). Among other things, by using an additional source (e.g., light or laser source, such as LED, etc.) in the center, the number of channels and the range of measurement depths increases. Here, for example, such implementations may create a plurality of source-detector separation distances (e.g., such as three, in certain implementations, for example, 21, 30, 47 mm), which correspond to that quantity of (e.g., three) measurement depths. According to implementations herein, the 'short' channels (e.g., 21 mm in this illustrative embodiment) may be utilized to increase the signal-to-ratio of the other channels by removing non-neuronal physiological signals. Embodiments herein may be configured in such manner, as implementations with such configurations demonstrate technical improvements due to the shorter distance between the source and detector, and/or the lesser depth that is achieved in terms of light penetration into the human brain tissue. For example, in this one illustrative implementation, by setting a channel distance at 21 mm or thereabouts, the light only reaches the depth of the human skull and does not reach the brain tissue itself. In this one example of signal differentiation, herein, the signals from these channels can then be subtracted from the signals of the other channels to remove the noise that arises from light interactions associated with the skull tissue. Further, some embodiments may have a medium channel of 30 mm and a long channel of 47 mm. Finally, it should be understood that such specific channel lengths are exemplary and other channel lengths fall within the ambit of the innovative technology disclosed. For example, the first channel may be a short channel of 19-23 mm, the second channel may be a medium channel of 28-32 mm, and the third channel may be a long channel of 45-49 mm. Further, the first or short channels may be 20-22 mm, the second or medium channels may be 29-31 mm, and the third or long channel may be 46-48 mm, in some embodiments.

The exemplary implementations of FIGS. 10B and 10C also illustrate embodiments wherein the overall brain-computer interface device has 20 optical sources and 10 optical detectors. However, other embodiments may contain different quantities of such components. For example, such BCI devices may comprise 12-28 of the optical sources and 6-14 of the optical detectors, or, in certain embodiments, 16-24 of the optical sources and 8-12 of the optical detectors.

FIG. 10C depicts an exemplary embodiment showing a set of optode components and their configuration, illustrating a full set of possible channels available in one exemplary implementation. Further, in the illustrated embodiment, one or more of the optodes may also be configured to transceive at two (2) wavelengths, such as 735 nm and 850 nm in one exemplary embodiment. Additionally, according to some implementations, such embodiments may utilize a master sample rate (e.g., when using USB connection) of approximately 250 Hz, and utilize a channel sample rate (i.e., given by the master sample rate divided by the number of sources), which may, for example, by 6 Hz in certain exemplary instances.

Various implementations herein may also utilize various connectivity to increase performance, such as sampling rate, according to one or more example embodiments. According to some implementations, for example, the disclosed technology may be constructed to include inbuilt WiFi module, which enables an increase in the master sample rate to over 1 kHz, therefore increasing channel sample rate when leveraging all of the sources to at least 25 Hz.

Figure 11A:
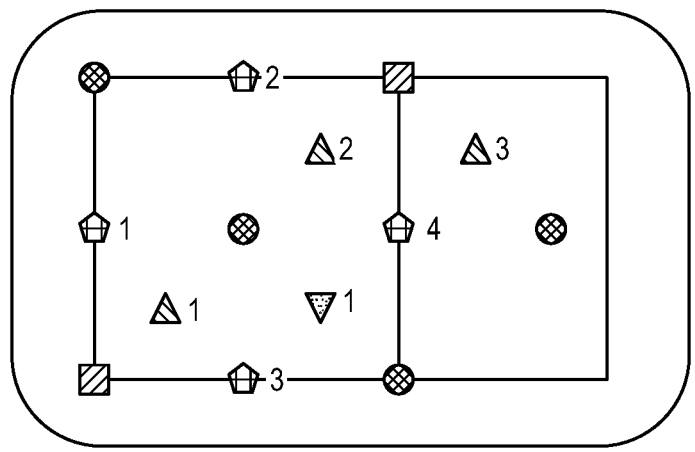
FIGS. 11A-11C depicts various other illustrative implementations regarding optode modules, consistent with various exemplary aspects of one or more implementations of the disclosed technology.
Figure 11B:
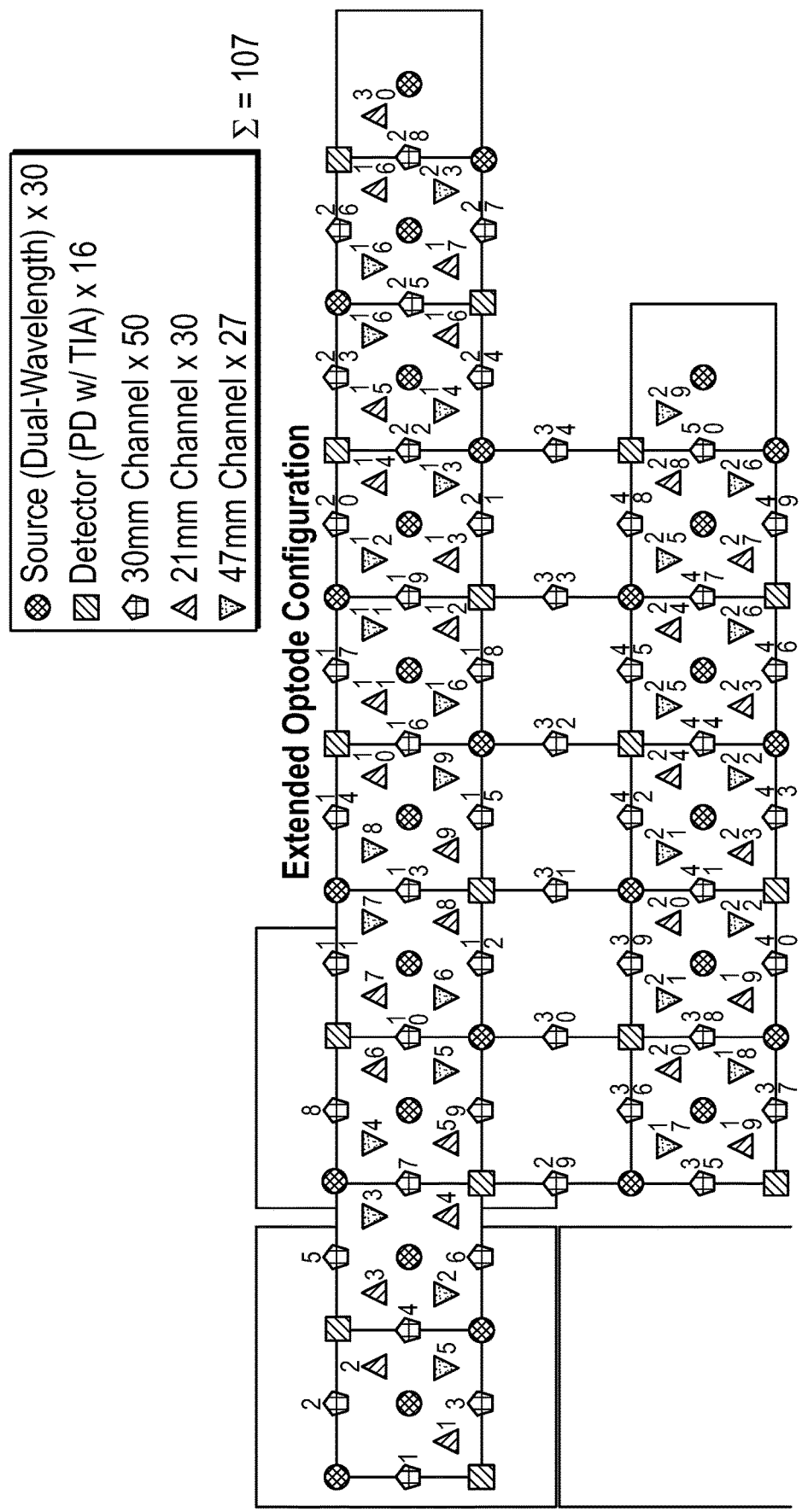
Figure 11C:
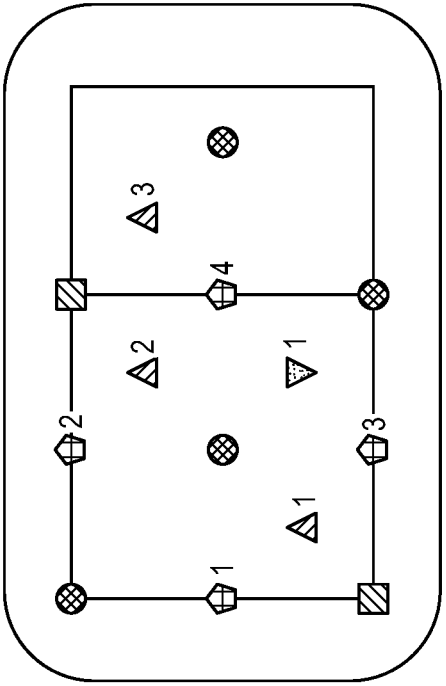

FIGS. 11A-11C depicts various other illustrative implementations regarding optode modules, consistent with various exemplary aspects of one or more implementations of the disclosed technology. FIG. 11B illustrates an array of optode modules wherein some of the optode modules are in both series and parallel arrangement(s) with each other. Further, the embodiments of FIGS. 11A-11B illustrate an exemplary optode module having 30 optical sources, 16 optical detectors, 30 first or short channels, 50 second or medium channels, and 27 third or long channels.

However, other embodiments may contain different quantities of such components. For example, such BCI devices may comprise 26-34 of the optical sources and 12-20 of the optical detectors, or, in certain embodiments, 28-32 of the optical sources and 14-18 of the optical detectors.

Similarly, other embodiments may comprise 26-34 of the first or short channel, 44-56 of the second or medium channel, and 23-31 of the third or long channel, and/or they may comprise 28-32 of the first or short channel, 47-53 of the second or medium channel, and 25-29 of the third or long channel.

Finally, the embodiment of FIG. 11C illustrates an exemplary optode module having 32 optical sources, 16 optical detectors, 30 first or short channels, 50 second or medium channels, and 27 third or long channels.

However, other embodiments may contain different quantities of such components. For example, such BCI devices may comprise 28-36 of the optical sources and 12-20 of the optical detectors, or, in certain embodiments, 30-34 of the optical sources and 14-18 of the optical detectors.

Embodiments may also have differing quantities of channels than that shown in FIG. 11C. For example, embodiments may have the differing quantities of channels specified in connection with FIGS. 11A-11B.

Overall Implementations of the Disclosed Technology

According to the above such technology, systems and methods herein may be utilized to detect and/or involve detection of at least haemodynamic signals and direct neuronal signals (fast optical signals) that both correspond to neural activity, simultaneously. In some embodiments, for example, the disclosed technology may leverage fast optical signals for brain-computer interfacing, whereas no existing device (combined with the above features and/or functionality, or otherwise) leverages both fast optical signals (FOS) and haemodynamic signals (which may be obtained, e.g., via near-infrared spectroscopy, NIRS), simultaneously, for brain-computer interfacing nor does any existing device use fast optical signals alone for brain-interfacing applications.

While the above disclosure sets forth certain illustrative examples, such as embodiments utilizing, involving and/or producing fast optical signal (FOS) and haemodynamic (e.g., NIRS, etc.) brain-computer interface features, the present disclosure encompasses multiple other potential arrangements and components that may be utilized to achieve the brain-interface innovations of the disclosed technology. Some other such alternative arrangements and/or components may include or involve other optical architectures that provide the desired results, signals, etc. (e.g., pick up NIRS and FOS simultaneously for brain-interfacing, etc.), while some such implementations may also enhance resolution and other metrics further.

Among other aspects, for example, implementations herein may utilize different optical sources than those set forth, above. Here, for example, such optical sources may include one or more of: semiconductor LEDs, superluminescent diodes or laser light sources with emission wavelengths principally, but not exclusively within ranges consistent with the near infrared wavelength and/or low water absorption loss window (e.g., 700-950 nm, etc.); non-semiconductor emitters; sources chosen to match other wavelength regions where losses and scattering are not prohibitive; here, e.g., in some embodiments, around 1060 nm and 1600 nm, inter alia, narrow linewidth (coherent) laser sources for interferometric measurements with coherence lengths long compared to the scattering path through the measurement material (here, e.g., (DFB) distributed feedback lasers, (DBR) distributed Bragg reflector lasers, vertical cavity surface emitting lasers (VCSEL) and/or narrow linewidth external cavity lasers; coherent wavelength swept sources (e.g., where the centre wavelength of the laser can be swept rapidly at 10-200 KHz or faster without losing its coherence, etc.); multiwavelength sources where a single element of co packaged device emits a range of wavelengths; modulated sources (e.g., such as via direct modulation of the semiconductor current or another means, etc.); and pulsed laser sources (e.g., pulsed laser sources with pulses between picoseconds and microseconds, etc.), among others that meet sufficient/proscribed criteria herein.

Implementations herein may also utilize different optical detectors than those set forth, above. Here, for example, such optical detectors may include one or more of: semiconductor pin diodes; semiconductor avalanche detectors; semiconductor diodes arranged in a high gain configuration, such as transimpedance configuration(s), etc.; single-photon avalanche detectors (SPAD); 2-D detector camera arrays, such as those based on CMOS {complementary metal oxide semiconductor} or CCD {charge-coupled device} technologies, e.g., with pixel resolutions of 5×5 to 1000×1000; 2-D single photon avalanche detector (SPAD) array cameras, e.g., with pixel resolutions of 5×5 to 1000×1000; and photomultiplier detectors, among others that meet sufficient/proscribed criteria herein.

Implementations herein may also utilize different optical routing components than those set forth, above. Here, for example, such optical routing components may include one or more of: silica optical fibre routing using single mode, multi-mode, few mode, fibre bundles or crystal fibres; polymer optical fibre routing; polymer waveguide routing; planar optical waveguide routing; slab waveguide/planar routing; free space routing using lenses, micro optics or diffractive elements; and wavelength selective or partial mirrors for light manipulation (e.g. diffractive or holographic elements, etc.), among others that meet sufficient/proscribed criteria herein.

Implementations herein may also utilize other different optical and/or computing elements than those set forth, above. Here, for example, such other optical/computing elements may include one or more of: interferometric, coherent, holographic optical detection elements and/or schemes; interferometric, coherent, and/or holographic lock-in detection schemes, e.g., where a separate reference and source light signal are separated and later combined; lock in detection elements and/or schemes; lock in detection applied to a frequency domain (FD) NIRS; detection of speckle for diffuse correlation spectroscopy to track tissue change, blood flow, etc. using single detectors or preferably 2-D detector arrays; interferometric, coherent, holographic system(s), elements and/or schemes where a wavelength swept laser is used to generate a changing interference patter which can be analysed; interferometric, coherent, holographic system where interference is detected on, e.g., a 2-D detector, camera array, etc.; interferometric, coherent, holographic system where interference is detected on a single detector; controllable routing optical medium such as a liquid crystal; and fast (electronics) decorrelator to implement diffuse decorrelation spectroscopy, among others that meet sufficient/proscribed criteria herein.

Implementations herein may also utilize other different optical schemes than those set forth, above. Here, for example, such other optical schemes may include one or more of: interferometric, coherent, and/or holographic schemes; diffuse decorrelation spectroscopy via speckle detection; FD-NIRS; and/or diffuse decorrelation spectroscopy combined with TD-NIRS or other variants, among others that meet sufficient/proscribed criteria herein.

Implementations herein may also utilize other multichannel features and/or capabilities than those set forth, above. Here, for example, such other multichannel features and/or capabilities may include one or more of: the sharing of a single light source across multiple channels; the sharing of a single detector (or detector array) across multiple channels; the use of a 2-D detector array to simultaneously receive the signal from multiple channels; multiplexing of light sources via direct switching or by using "fast" attenuators or switches; multiplexing of detector channels on to a single detector (or detector array) via by using "fast" attenuators or switches in the routing circuit; distinguishing different channels/multiplexing by using different wavelengths of optical source; and distinguishing different channels/multiplexing by modulating the optical sources differently, among others that meet sufficient/proscribed criteria herein.

As disclosed herein, implementations and features of the present inventions may be implemented through computer-hardware, software and/or firmware. For example, the systems and methods disclosed herein may be embodied in various forms including, for example, one or more data processors, such as computer(s), server(s) and the like, and may also include or access at least one database, digital electronic circuitry, firmware, software, or in combinations of them. Further, while some of the disclosed implementations describe specific (e.g., hardware, etc.) components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the inventions or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the inventions, or it may be more convenient to construct a specialized apparatus or system to perform the required methods and techniques.

In the present description, the terms component, module, device, etc. may refer to any type of logical or functional device, process or blocks that may be implemented in a variety of ways. For example, the functions of various blocks can be combined with one another and/or distributed into any other number of modules. Each module can be implemented as a software program stored on a tangible memory (e.g., random access memory, read only memory, CD-ROM memory, hard disk drive) within or associated with the computing elements, sensors, receivers, etc. disclosed above, e.g., to be read by a processing unit to implement the functions of the innovations herein. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy logic, neural networks, other AI (Artificial Intelligence) or machine learning systems, quantum devices, and hybrids of any of the above device types.

It should also be noted that various logic and/or features disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in tangible various forms (e.g., optical, magnetic or semiconductor storage media), though do not encompass transitory media.

Other implementations of the inventions will be apparent to those skilled in the art from consideration of the specification and practice of the innovations disclosed herein. It is intended that the specification and examples be considered as exemplary only, with a true scope and spirit of the inventions being indicated by the present disclosure and various associated principles of related patent doctrine.

The invention claimed is:

1. A non-invasive device configured for wearing on a head or adjacent a user's brain, the device comprising:
   one or more portions, panels and/or subcomponents that face the brain, each including:
   one or more sources of optical energy configured to emit an optical signal into the head of the user at one or more wavelengths between about 735 nm and about 850 nm, wherein the optical signal travels into and out of tissue of the head along a plurality of optical paths, exiting the head as received signals; and
   one or more detectors that detect the received signals associated with the optical signal, wherein each of the received signals travels along an optical path distance ranging from about 19 mm to about 49 mm from a source of optical energy, extending into and out of a depth of the tissue, and terminating at one of the one or more detectors, wherein the optical paths establish one or more channels that define a plurality of different separation distances through the tissue for specified pairings of sources and detectors, wherein the one or more channels include at least two or more of a first channel of between about 19 mm and about 23 mm, a second channel of between about 28 mm and about 32 mm, and a third channel of between about 45 mm and about 49 mm;
   wherein the one or more sources and the one or more detectors are arranged in an array of optode modules that provide a plurality of the channels, with each said channel being established between a source and an associated one of the one or more detectors, wherein the array of optode modules comprise a first set of the optode modules that are aligned in sequence as a first series arrangement of modules and a second set of the optode modules aligned in sequence as a second series arrangement of modules, wherein the second series arrangement of modules is positioned in parallel with the first series arrangement of modules.

2. The device of claim 1, wherein a subset of the one or more sources and the one or more detectors are arranged in each of the optode modules.

3. The device of claim 2, wherein each of the optode modules comprises 3-5 of the one or more sources and 1-3 of the one or more detectors, wherein at least one of the sources is positioned at or near a center of each of the optode modules.

4. The device of claim 2, wherein the plurality of channels comprise 3 channels, wherein each channel corresponds to a measuring depth from the one or more sources to a depth at which a measurement is taken in the head and/or brain.

5. The device of claim 4, wherein the plurality of channels include a first channel, a second channel, and a third channel, wherein the first channel is a short channel of 19-23 mm, the second channel is a medium channel of 28-32 mm, and the third channel is a long channel of 45-49 mm.

6. The device of claim 5, wherein one or more of the short channel is 20-22 mm, the medium channel is 29-31 mm, and the third channel is 46-48 mm, preferably.

7. The device of claim 5, wherein the device comprises 16-24 of the one or more sources and 8-12 of the one or more detectors, where the device is adapted to provide detection of brain activity of a brain motor cortex to decode imagined speech.

8. The device of claim 7, wherein fluctuations in detected versions of the optical signals reflected at various depths in the brain are utilized to detect one or both of neuronal changes in neurons in the brain and/or blood changes at an active site of the brain.

9. The device of claim 8, further comprising:
one or more computing subcomponents configured to generate control signals and/or perform processing related to generation of the optical signal by the one or more sources and/or processing of the received signals that are detected by the one or more detectors.

10. The device of claim 9, wherein:
at least one of the one or more computing subcomponents is configured to perform one or both of fast optical signal processing and/or haemodynamic measurement and/or signal processing, wherein:
the fast optical signal processing comprises:
directing the optical signal through one or more first regions of neural activity in which changes in neuronal properties alter optical properties of brain tissue in the one or more first regions, causing the optical signal to scatter differently as a scattered signal;
detecting the scattered signal by the one or more detectors; and
processing the scattered signal as the received signal; and
the haemodynamic measurement signal processing comprises:
directing the optical signal through one or more second regions of neural activity that have active blood flood in nearby sites, at which changes in blood flow alter optical absorption properties of the brain tissue;
detecting non-absorbed portions of the optical signal by the one or more detectors; and
processing the non-absorbed portions as the received signal.

11. The device of claim 10, wherein the device is configured detect both fast optical signals and haemodynamic signals, simultaneously.

12. The device of claim 1, wherein, in regard to quantity of the plurality of channels, for each wavelength of the optical signal, the device comprises 17-21 of the first channel, 26-30 of the second channel, and 15-19 of the third channel.

13. The device of claim 1, wherein the device comprises 26-34 of the one or more sources and 12-20 of the one or more detectors, preferably.

14. The device of claim 1, wherein, in regard to quantity of the plurality of channels, for each wavelength of the optical signal, the device comprises 26-34 of the first channel, 44-56 of the second channel, and 23-31 of the third channel.

15. The device of claim 1, wherein the device comprises 28-36 of the one or more sources and 12-20 of the one or more detectors.

16. The device of claim 1, further comprising at least one source driver configured to send a control signal to drive and/or activate the one or more sources at one or more of a set intensity, frequency and/or wavelength.

17. The device of claim 1, wherein the one or more portions, panels and/or subcomponents are configured to be adjustably positioned over regions of the brain to capture signals of interest.

18. A system comprising:
a non-invasive device according to claim 1;
one or more computing subcomponents, including a microcontroller, configured to generate control signals and/or perform processing related to generation of the optical signal by the one or more sources and/or processing of the received signals that are detected by the one or more detectors;
at least one driver component comprising circuitry that controls emission of the optical signal by the one or more sources;
power management circuitry coupled to electronics in the device and configured to maintain the device electrically isolated during use; and
at least one computing device configured to process data related to set-up, data visualization, capture of the received signals detected by the one or more detectors, and/or processing of the received signals detected by the one or more detectors, including signal classification.

19. The device of claim 1, wherein:
at least one computing component and/or driver is configured to control the one or more sources and/or the one or more detectors to transceive at 2 wavelengths, 735 nm and 850 nm.

20. A method comprising:
emitting, via one or more sources of the non-invasive device according to claim 1 configured for wearing on a head or adjacent a user's brain, an optical signal at one or more frequencies;
detecting, via one or more detectors of the device, a received signal associated with the optical signal;
wherein the one or more sources and the one or more detectors are arranged in an array to provide a plurality of channels therebetween; and
performing processing of the received signals in connection with determining imagined speech associated detected a mind/brain activity associated with the received signal.

* * * * *